2,776,274
Patented Jan. 1, 1957

2,776,274

POLYETHYLENE REFINING

Robert E. Cairns, Springfield, Mass., assignor to Monsanto Chemical Company, St. Louis, Mo., a corporation of Delaware No Drawing. Application January 22, 1954,
Serial No. 405,651

3 Claims. (Cl. 260—94.9)

This invention relates to a method for processing polyethylene. More particularly the invention relates to a method for refining crude polyethylene.

The polyethylene suitable for use in this invention is a normally solid homopolymer of ethylene having a molecular weight of between 15,000 and 25,000. These polymers are tough solids at normal temperatures with a fusion point of from 200° F. to 250° F. The homopolymers are generally prepared by mass polymerization under elevated temperatures and pressures as described, for example, in Fawcett Patent 2,153,553. The polymers produced by this process are generally non-uniform in physical structure and when extruded into thin sheets exhibits translucent or opaque spots which, because of their physical appearance, have come to be known in the art as fisheyes. The elimination of these fisheyes is a major problem in the polyethylene industry because they are not only unsightly but also tend to weaken or disrupt the films prepared from the polyethylene.

One object of this invention is to provide a process for refining homopolymers of ethylene.

A further object is to provide a process for removing fisheyes from homopolymers of ethylenes.

These and other objects are attained by subjecting the polyethylene to intensive mixing in a closed chamber under strictly limited conditions of pressure, temperature and peripheral speed of the mixer rotor.

The following examples are given in illustration and are not intended as limitations on the scope of this invention.

*Example I*

Polyethylene prepared by the process described in the Fawcett Patent 2,153,553 was extruded into a thin sheet by conventional extrusion methods. Difficulty was experienced in obtaining the sheet material. On careful examination, the sheet was found to have numerous translucent to opaque fisheyes and the sheet tore easily at the fisheyes but was strong and tough in the sections containing no fisheyes.

*Example II*

Polyethylene from the same batch as that of Example I was placed in a Banbury-type mixer. The mixer was cold (i. e. room temperature) and the temperature of the polyethylene was 55° F. The mixer was started and a pressure of 25 p. s. i. was exerted on the polyethylene by means of the pressure head on the mixer. After one minute of operation under these conditions, the temperature of the polyethylene had risen to 200° F. The pressure was immediately lowered to from 1 to 2 p. s. i. and mixing was continued for 5 more minutes. The faster rotor of the two rotors in the mixer was turned at a peripheral speed of from 220 to 230 feet per minute throughout the test. The temperature of the polyethylene rose gradually from 200° F. to 245° F. during the run. The rotor and the walls of the mixer were constantly cooled during the run by circulating cold water (circa 50° F.) therethrough. At the end of the 6 minute run the mixer was stopped and the polyethylene was unloaded therefrom. It was a stiff doughy mass. The mass thus prepared extruded without difficulty and a clear sheet was obtained having substantially no fisheyes.

Attempts to eliminate the fisheyes in the extruded sheet of Example I by re-extruding the polyethylene a second or third time only partially improved the sheets obtained with regard to the frequency of fisheyes. However, when the extruded sheet containing the fisheyes was mixed in a Banbury-type mixer under the conditions of Example II the fisheyes were substantially eliminated.

*Example III*

Four different polyethylenes from different commercial sources, all of which contained numerous fisheyes were subjected to intensive mixing as in Example II. All of these materials regardless of source were freed of fisheyes by this procedure.

When attempts were made to vary the pressure, temperature and peripheral speed conditions of Example II, it was found that only minor variations could be made without losing the benefits of the process. Thus the peripheral speed of the faster rotor could be varied between 200 and 285 feet per minute. Outside this speed range substantially no reduction in fisheyes occurred.

Similarly when any part of the Banbury-type mixer was heated by circulating hot or even warm water therethrough, the process became inefficient and the fisheyes remained untouched. The temperature of the circulating water could however be varied between 35 and 80° F.

The pressure on the polyethylene must be carefully regulated. At the beginning of the mixing cycle, the pressure should be between 20 and 30 p. s. i. on the material in the mixing chamber. However, this pressure must be reduced to no more than 5 p. s. i. and preferably to from 1 to 2 p. s. i. within 2 minutes after the start of the mixing cycle. If the higher pressure is maintained on the polyethylene for too long a period, no substantial reduction in fisheyes is obtained.

The intensive mixing process should be continued for at least 5 minutes after the mixer is started. At the end of 5 minutes the greater proportion of the fisheyes are removed. It is advisable with material having an average number of fisheyes to continue the mixing operation for about 1 minute longer to complete the removal of the fisheyes and for up to 10 minutes longer for material having a relatively large number of fisheyes.

The process of this invention is restricted to intensive mixing of the polyethylene in an enclosed chamber under positive pressure, the mixing action being applied by a plurality of rotating members which turn at different peripheral speeds. The mixing action occurs in the area between the rotating members and also in the area between the wall surfaces of the chamber and the surfaces of the rotating members. This type of mixing results in the transformation of the energy of rotation of the rotating members into heat in the polyethylene through the agency of friction both internal and external with respect to the polyethylene.

The mixers which can be used to eliminate the fisheyes by the process of this invention are intensive mixers commonly known as Banbury-type mixers. They consist essentially of a completely enclosed mixing chamber in which two spirally shaped rotors revolve in opposite directions at slightly different speeds. The mixers have a hopper in which a pressure head may be inserted to exert pressure on the material being mixed. The rotors and the walls of the mixer are cored for the circulation of temperature regulating media therethrough.

Other well-known mixers for plastic materials such as the double bladed dough mixers or mixers having sigma type rotors or blades cannot be operated under economically practical conditions to remove the fisheyes in the polyethylene. Even the ordinary extrusion processes which would be expected to give intensive mixing under pressure are inefficient and practically useless for removing the fisheyes.

The process of this invention is applicable to solid tough homopolymers of ethylene having a molecular weight in the range of 15,000 to 25,000. No substantial amount of solvents or other liquids should be present whether the liquids are compatible or incompatible with the polyethylene. No lubricants, plasticizers, fillers or other additives should be present in this refining process since such materials retard and in many cases prevent the removal of the fisheyes.

What is claimed is:

1. A process for refining polyethylene which comprises subjecting polyethylene to intensive mixing in an enclosed chamber under positive pressure, said mixing action being applied by a plurality of, spirally shaped rotating members which turn at different peripheral speeds, said intensive mixing being restricted to the following cycle: (1) mixing the polyethylene at 20 to 30 p. s. i. for no more than 2 minutes with the faster rotating member revolving at a peripheral speed of 200 to 285 feet per minute, (2) continuing the mixing at no more than 5 p. s. i. and a peripheral speed of the faster rotating member of 200 to 285 feet per minute, the rotating members and the walls of the enclosed chamber being cooled throughout the mixing cycle by circulation of water at a temperature of 35 to 80° F. therethrough, the entire cycle having a duration of at least 5 minutes, said process resulting in a substantially complete removal of fisheyes from the polyethylene.

2. A process for removing fisheyes from polyethylene which consists in mixing polyethylene in a Banbury-type mixer under a pressure of 20 to 30 p. s. i. for no more than 2 minutes and then continuing the mixing under a pressure of no more than 5 p. s. i., the faster rotor of the mixer operating at a peripheral speed of from 200 to 285 feet per minute throughout the mixing cycle and the rotor and walls of said mixer being cooled by circulation of water at a temperature of from 35 to 80° F. through the core and jacket thereof respectively, the entire mixing cycle having a duration of at least 5 minutes, said process resulting in a substantially complete removal of fisheyes from the polyethylene.

3. A process for removing fisheyes from polyethylene which consists in mixing polyethylene in a Banbury-type mixer under a pressure of 25 p. s. i. for 1 minute and then continuing the mixing under a pressure of 1 to 2 p. s. i. for 5 minutes, the faster rotor of the mixer operating at a peripheral speed of 220 to 230 feet per minute throughout the mixing cycle and the rotor and walls of said mixer being cooled by circulation of water at a temperature of 50° F. through the core and jacket thereof respectively, said process resulting in a substantially complete removal of fisheyes from the polyethylene.

References Cited in the file of this patent

UNITED STATES PATENTS

| 2,451,743 | Jarrett | Oct. 19, 1948 |

FOREIGN PATENTS

| 644,429 | Great Britain | Oct. 11, 1950 |
| 688,403 | Great Britain | Mar. 4, 1953 |